March 22, 1949. A. A. GRADISAR 2,465,083
CONNECTING PARTS OF OPTICAL INSTRUMENTS
Filed Nov. 18, 1943 2 Sheets-Sheet 1
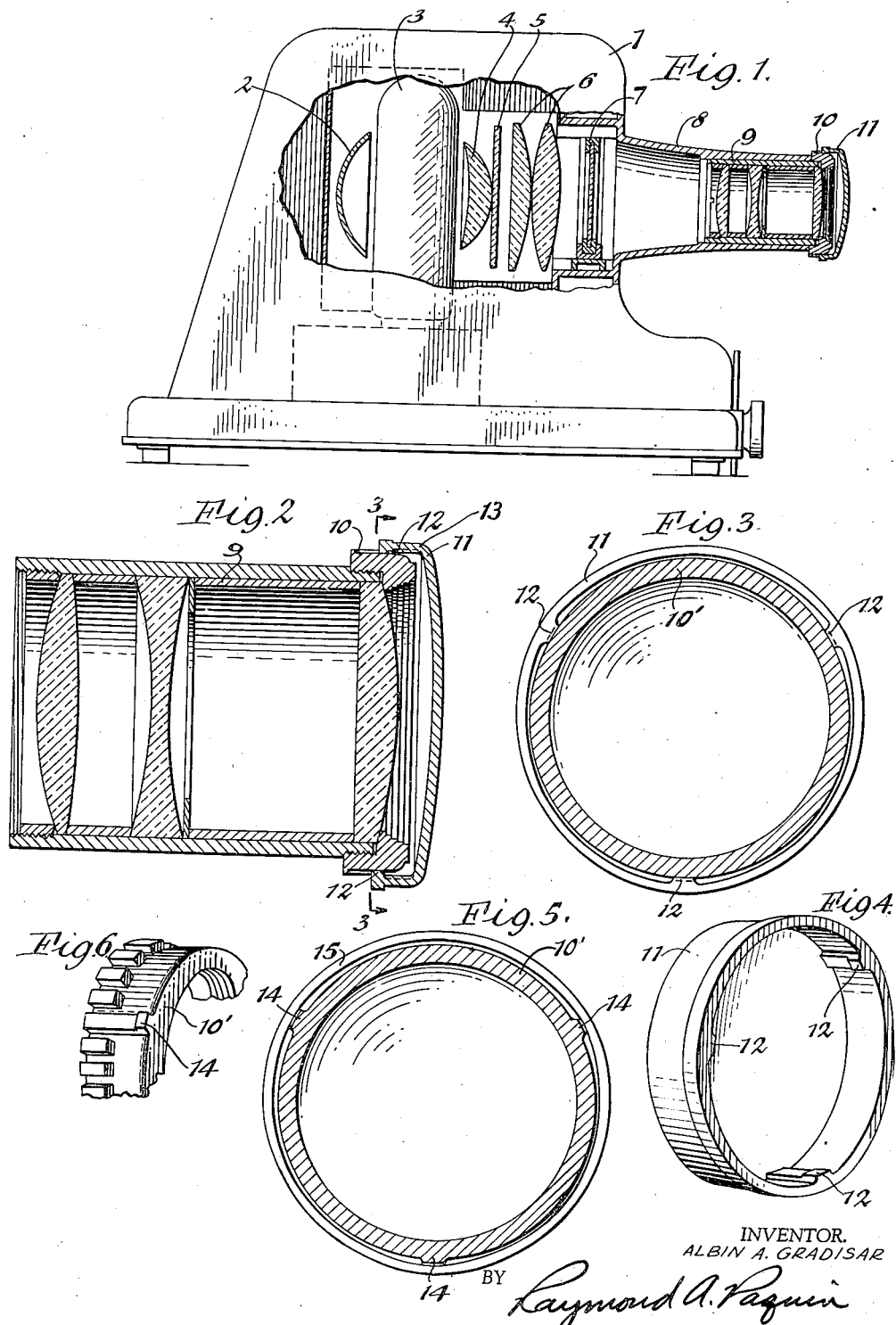
INVENTOR.
ALBIN A. GRADISAR
BY Raymond A. Paquin
ATTORNEY March 22, 1949. A. A. GRADISAR 2,465,083
CONNECTING PARTS OF OPTICAL INSTRUMENTS
Filed Nov. 18, 1943 2 Sheets-Sheet 2
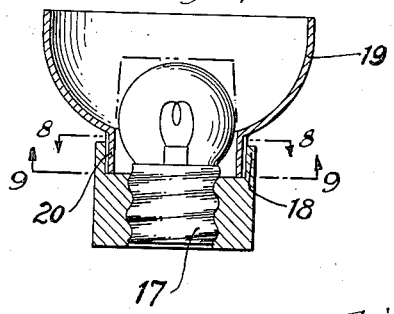
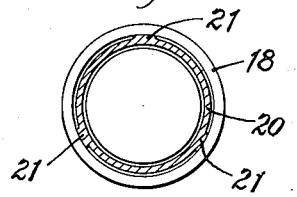
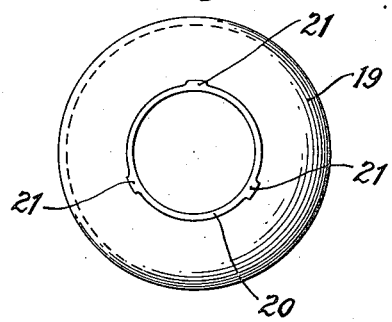
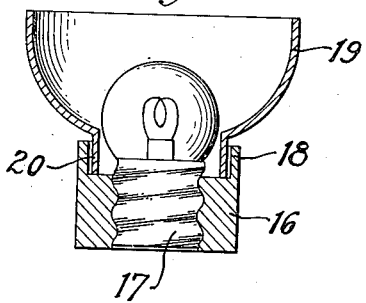
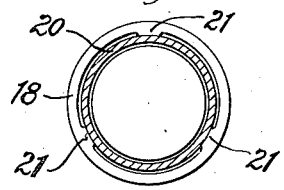
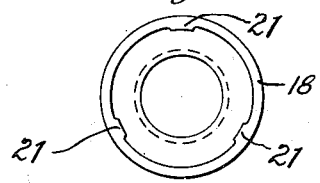
INVENTOR.
ALBIN A. GRADISAR.
BY Raymond A. Paquin
ATTORNEY Patented Mar. 22, 1949

2,465,083

UNITED STATES PATENT OFFICE 2,465,083

CONNECTING PARTS OF OPTICAL INSTRUMENTS

Albin A. Gradisar, Buffalo, N. Y., assignor, by mesne assignments, to American Optical Company, Southbridge, Mass., a voluntary association Application November 18, 1943, Serial No. 510,779

6 Claims. (Cl. 287—126)

1

This invention relates to telescopic connections in optical instruments or the like and has particular reference to new and improved means for connecting the interchangeable or easily removable parts of such instruments or the like to the body portions thereof.

An object of the invention is to provide new and improved means for frictionally and telescopically connecting the interchangeable or easily removable parts of a device to a relatively fixed portion thereof.

Another object of the invention is to provide new and improved means for axially and telescopically connecting removable cylindrical parts of instruments or the like, to relatively fixed cylindrical parts thereof whereby a yieldable gripping action will be obtained between the parts which allows the parts to be separated both easily and quickly while maintaining the parts against inadvertent separation.

Another object of the invention is to provide new and improved means for securing a removable part of an instrument or the like to an instrument body whereby the connection between the part and body will be secure but which also allows the parts to be easily and quickly connected or disconnected by relative straight line movement between the part and body.

Another object of the invention is to provide a relatively simple efficient and economical means for frictionally connecting parts telescopically.

Other objects and advantages of the invention will be apparent from the following description taken in connection with the accompanying drawings. It will be understood that many changes may be made in the details of construction and arrangement of parts without departing from the spirit of the invention as expressed in the accompanying claims. I, therefore, do not wish to be limited to the exact details of construction and arrangement of parts shown and described as the preferred form has been shown by way of illustration only.

Referring to the drawings:

Fig. 1 is a side view, partly in section, of a projection apparatus embodying the invention;

Fig. 2 is a fragmentary sectional view similar to Fig. 1 but on an enlarged scale;

Fig. 3 is a sectional view taken on line 3—3 of Fig. 2, looking in the direction of the arrows;

Fig. 4 is a perspective view of the form of the invention shown in Figs. 1 to 3 inclusive;

Fig. 5 is a view similar to Fig. 3 but showing a further form of the invention;

Fig. 6 is a fragmentary perspective view showing the form of the invention shown in Fig. 5;

Fig. 7 is a sectional view showing another application of the invention;

Fig. 8 is a sectional view taken on line 8—8 of Fig. 7 looking in the direction of the arrows;

2

Fig. 9 is a bottom plan view of the reflector as observed from line 9—9 of Fig. 7 looking in the direction of the arrows;

Fig. 10 is a view similar to Fig. 7 but showing another form of the invention;

Fig. 11 is a view similar to Fig. 8 but showing the form of the invention shown in Fig. 10; and Fig. 12 is a top plan view of the socket member for receiving the reflector.

In the construction of optical instruments it is often necessary that certain parts such as dust covers or caps, filter holders, reflectors and the like be removably or interchangeably connected to the instrument whereby such parts will be firmly retained in operative position relative to the instrument until such time as it is desired to remove or interchange such part at which time the part may be easily and quickly removed or interchanged.

It is, therefore, the object of this invention to provide a new and improved means for connecting such parts to the instrument whereby the parts may be easily and quickly attached to or detached from the instrument and yet be capable of firm engagement with the instrument when in position thereon.

Referring more particularly to the drawings wherein similar reference characters designate corresponding parts throughout the several views, the invention has been shown in Figs. 1 to 6 inclusive applied to a projector for the purpose of illustration.

The projector with which the invention is shown, as will be seen from Fig. 1 comprises a housing 1 containing a reflector 2, lamp 3, condenser lenses 4 and 6 and heat resisting filter 5.

In alignment with the above specified projection system is the slide holder 7, objective tube 8 and projection objective lens system 9.

The said projection objective lens system 9 is contained in a tubular support having the ring 10 by means of which the said lens system 9 may be adjusted for focusing and said ring 10 supports the dust cap 11 which is placed over and telescoped on the end of the ring when the projector is not in use to prevent dust or moisture from reaching the lens system.

The cap 11 comprises the ring or flange portion 13 having the internal integral projections 12 which may be of any desired number by preferably at least three in number to give increased stability and firmness to the connection. In this type of construction the increased stability of the connection is obtained by means of the projections or lugs 12 as described above together with the elasticity or resilience of one part or the other, in this example the ring 13. For this reason the part having the desired resilience or elasticity is preferably constructed of a thermo-plastic or relatively thin metal.

As stated, the ring portion 13 of the cap 11 is constructed of relatively thin wall resilient material, from the inner surface of which projects three or more relatively rigid, reinforcing rib-like cap supporting lugs 12 which, as shown in Fig. 4, extend longitudinally of the cap ring for substantially the full width thereof; or as shown in Fig. 6, the lugs may be similarly arranged on the outer surface of the coacting cylindrical surface of the lens holding ring 10. In either case however the arcuate thin wall portions 13, extending between the lugs 12, are supported in bridged or spaced flexed condition about the periphery of the associated lens holding ring 10, when the cap 11 is in telescopic relation with the ring, as is clearly shown in Fig. 3 of the drawings. The resilient material of the intermediate thin wall portions of the cap are thus utilized to yieldably hold the relatively stiff lugs in frictional gripping engagement with the opposed cylindrical surface of the associated supporting ring. Each lug 12 is shown extending the full width of the flange or ring portion 13 of the cap to provide desired rigidity axially thereof and provided adjacent one end with a relatively short bearing and gripping surface portion which extends slightly beyond the body of the lug in a radial direction. The reinforcing lugs may thus be of any length, depending on the width of the telescoping parts without increasing the bearing and gripping action between the parts. As shown in Fig. 4, these restricted bearing portions, at the free edge of the ring 13, provide desired frictional engagement with the holding ring 10 and at the same time provide for relative ease of placing the cap and moving it to final position on the holding ring or removing it therefrom. It is to be noted that the friction surfaces of the lug bearing portions are normally disposed in a circle of slightly less diameter than the outer diameter of the ring 10.

While the invention has been shown applied to a dust cap it could be equally applied to a filter holder, protective window or other accessory where this type of connection is desired.

In Figs. 5 and 6 a reverse form of the invention has been shown. In this form the ring 10' is provided with the upstanding lugs 14 of desired number as stated in connection with the form of the invention shown in Figs. 1 to 4 inclusive and the member 11 is provided with the resilient ring 15 adapted to fit over the lugs 14 and the elasticity or resilience of the spring 15 when in applied distorted position firmly holds the cap in frictional engagement with the ring 10'.

The lugs 12 and 14 may be formed integral with either part or formed separately and secured thereto.

In Figs. 7 to 12 inclusive the invention has been shown applied to a reflector connection for an optical instrument and this form comprises the socket member 16 adapted to receive the lamp bulb 17. The socket member 16 is provided with the marginal flange 18.

The reflector 19 has the ring portion 20 adapted to enter the flange 18 and the lugs 21 may be on the ring portion 20 of the reflector 19 as shown in Figs. 7, 8, and 9 or on the flange 18 as shown in Figs. 10, 11 and 12. Also either of the members 20 or 18 may be formed with the desired elasticity or resiliency or both of said parts may be so formed.

This arrangement allows the removal of the reflector to give access to the lamp bulb 17 for insertion or removal of the bulb by removing the reflector which has its central opening of such size as to slip over the lamp bulb 17 and yet because of the lugs 21 and elasticity of the parts the connection between the reflector and socket member is such that the reflector will be firmly retained in position regardless of the position the lamp and reflector are secured in the instrument.

This type of connection has many applications in optical instruments and the applications shown are shown merely for the purpose of illustration. While the invention is herein disclosed in association with certain specific structures, it is to be understood that same will find advantageous application in various other structures which include members having a removable telescopic connection with fixed parts thereof.

The structures with which the invention is shown disclose the resilient cylindrical portion of the removable member as being telescopically engaged over and within a fixed cylindrical portion. The relatively rigid lugs are disposed between the two cylindrical portions and may be secured to either thereof.

From the foregoing it will be seen that I have provided simple, efficient and economical means for obtaining all of the objects and advantages of the invention.

Having described my invention, I claim:

1. A structure including a pair of telescopically engageable and readily disengageable members, one of said members including a relatively rigid cylindrical part and the other member including a thin walled normally cylindrical part of resilient non-compressible material, the radius of the inner surface of the telescoping part being greater than the radius of the outer surface of the telescoped part, and at least three relatively narrow rigid lugs projecting from the surface of one of the parts and extending longitudinally thereof in widely spaced relation circumferentially thereof, said lugs having a dimension radially of the part from which they project slightly in excess of the difference between the radii of said surfaces, whereby said lugs react against the opposing surface of the other part with a resulting flexing of the relatively wide circumferential areas at the resilient part between the lugs for maintaining the lugs in relatively light frictional engagement with the opposing surface of the other part.

2. In combination, a relatively rigid cylindrical member, a normally cylindrical member for removable telescopic engagement with the first member and having a relatively thin yieldable wall, the opposing inner and outer surfaces of the respective telescopic members having different radii, and a plurality of relatively rigid lugs projecting from the surface of one of the members in circumferentially spaced relation of approximately 120°, said lugs being of a dimension radially of the member from which they project in excess of the difference between the radii of said opposing surfaces and being disposed between the members in their telescopically engaged position, with the free edges of the lugs reacting on the opposing surface and thereby flexing the relatively thin wall of the resilient member toward the wall of the other member between said lugs, whereby the lugs provide a relatively light frictional grip between said members.

3. The structure according to claim 1 wherein said lugs project from and are integral with the relatively thin cylindrical part to add stability thereto.

4. The structure according to claim 2 wherein said lugs extend longitudinally of and are integral with the relatively thin yieldable wall to add rigidity thereto throughout the length and area of said lugs.

5. A structure including a pair of telescopically engageable and readily disengageable cylindrical members, one of said members being relatively rigid and the other member being resilient, the opposing inner and outer surfaces of the respective telescopic members being of unequal radii, a plurality of lugs projecting from the surface of one of the members in spaced relation circumferentially thereof and extending axially of the member, said lugs being of a dimension radially of the member from which they project less than the difference between the radii of said surfaces, and radial projections on said lugs whose free ends are spaced from the surface of said member from which the lugs project at distances greater than the difference between the radii of said surfaces, whereby the free ends of the projections engage the opposing surface with a resulting flexing of the wall of the yieldable member between the lugs and which latter transfer the flexing action of the projections axially of the flexible wall.

6. In combination, a pair of telescopically engageable and readily disengageable cylindrical members, one of said members having a resilient flexible wall and the opposing surfaces of the members being of unequal radii, a plurality of projections extending from the surface of one of the members and being of a radial dimension in excess of the difference between the radii of said surfaces, whereby the free ends of the projections react on the surface of the other member with a resulting flexure of the resilient wall between the projections, and rigid lugs on the flexible wall extending axially thereof in line with said projections.

ALBIN A. GRADISAR.

REFERENCES CITED

The following references are of record in the file of this patent:

UNITED STATES PATENTS

| Number | Name | Date |
|---|---|---|
| 894,594 | Cani | July 28, 1908 |
| 1,102,009 | Csanyi | June 30, 1914 |
| 1,104,179 | Folmer | July 21, 1914 |
| 1,138,848 | Dake | May 11, 1915 |
| 1,283,963 | Takahashi | Nov. 5, 1918 |
| 1,321,521 | Green | Nov. 11, 1919 |
| 1,346,138 | Smalley | July 13, 1920 |
| 1,760,827 | Goldhammer | May 27, 1930 |
| 1,848,879 | Halbasch | Mar. 8, 1932 |
| 1,916,194 | Godley | July 4, 1933 |
| 1,941,235 | Unke | Dec. 26, 1933 |
| 1,982,044 | Clark | Nov. 27, 1934 |
| 2,111,244 | Hueglin | Mar. 15, 1938 |
| 2,197,184 | Kemp | Apr. 16, 1940 |
| 2,218,884 | Kellner | Oct. 22, 1940 |
| 2,224,793 | Malcom | Dec. 10, 1940 |
| 2,241,596 | Guhl | May 13, 1941 |
| 2,260,712 | Harrison | Oct. 28, 1941 |

FOREIGN PATENTS

| Number | Country | Date |
|---|---|---|
| 501,710 | Great Britain | Mar. 3, 1939 |
| 662,591 | Germany | July 16, 1938 |